United States Patent
Sartor et al.

(10) Patent No.: US 9,658,831 B2
(45) Date of Patent: May 23, 2017

(54) OPTICAL RANDOM NUMBER GENERATOR AND METHOD FOR GENERATING A RANDOM NUMBER

(71) Applicant: Sony Corporation, Minato-ku (JP)

(72) Inventors: Piergiorgio Sartor, Fellbach (DE); Klaus Zimmermann, Neckartenzlingen (DE)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 14/591,324

(22) Filed: Jan. 7, 2015

(65) Prior Publication Data

US 2015/0261502 A1    Sep. 17, 2015

(30) Foreign Application Priority Data

Mar. 11, 2014    (EP) ..................................... 14158968

(51) Int. Cl.
*G06F 7/58*    (2006.01)
*G06N 99/00*    (2010.01)

(52) U.S. Cl.
CPC ................ *G06F 7/588* (2013.01); *G06F 7/58* (2013.01); *G06N 99/00* (2013.01)

(58) Field of Classification Search
CPC ....................................................... G06F 7/588
USPC ......................................................... 359/107
See application file for complete search history.

(56) References Cited

U.S. PATENT DOCUMENTS

| | | | |
|---|---|---|---|
| 8,259,293 B2 * | 9/2012 | Andreou | ........... H01L 27/14603 |
| | | | 356/222 |
| 2006/0010182 A1 * | 1/2006 | Altepeter | .................. G06F 7/58 |
| | | | 708/250 |
| 2016/0056185 A1 * | 2/2016 | McLeod | ........... H01L 31/02164 |
| | | | 250/208.3 |

FOREIGN PATENT DOCUMENTS

| WO | WO 2008/077833 A1 | 7/2008 |
|---|---|---|
| WO | WO 2013/134306 A1 | 9/2013 |

OTHER PUBLICATIONS

U.S. Appl. No. 14/588,511, filed Jan. 2, 2015, Sartor, et al.
Samuel Burri , et al., "Jailbreak Imagers: Transforming a Single-Photon Image Sensor into a True Random Number Generator.", 2013, 4 pgs.
M. Stipcevic, et al., "Quantum random number generator based on photonic emission in semiconductors", Review of Scientific Instruments, 78, 045104, 2007, 7 pgs.
Michael A. Wayne, et al., "Photon arrival time quantum random number generation", Journal of Modern Optics, 2009, 8 pgs.

* cited by examiner

*Primary Examiner* — Bumsuk Won
*Assistant Examiner* — Grant Gagnon
(74) *Attorney, Agent, or Firm* — Oblon, McClelland, Maier & Neustadt, L.L.P.

(57) ABSTRACT

An optical random number generator has:
a light source (2) for randomly emitting photons (9);
an array (3) of single photon avalanche diodes for detecting the photons (9) provided by the light source (2), wherein the array (3) of single photon avalanche diodes is positioned in a predefined distance (d) to the light source (2); and
a control (10) coupled to the array (3) of single photon avalanche diodes and for determining an arrival time of the photons (9) detected by each of the single photon (Continued)

avalanche diodes of the array (3) of single photon avalanche diodes, and for generating a random number on the basis of the arrival time.

20 Claims, 2 Drawing Sheets

OPTICAL RANDOM NUMBER GENERATOR AND METHOD FOR GENERATING A RANDOM NUMBER

TECHNICAL FIELD

The present disclosure generally pertains to an optical random number generator and a method for generating a random number.

TECHNICAL BACKGROUND

Random numbers are required in many applications. For example, it is known to use random numbers for password or cryptographic key generation, for gaming, etc.

Typically, pseudorandom numbers are used for many applications, since they are easy to generate by executing a respective computational algorithm. However, especially for security related applications, true random numbers are increasingly used, which are generated on the basis of a physical phenomenon that is expected to be random.

True random number generators are known. They are based on physical mechanisms, such as thermally induced jitter from ring oscillators, block RAM write collisions and can exploit, e.g. optical effects.

Although there exist techniques for generating true random numbers, it is generally desirable to improve the generation of true random numbers.

SUMMARY

According to a first aspect the disclosure provides an optical random number generator. The optical random number generator comprises a light source configured to randomly emit photons, an array of single photon avalanche diodes configured to detect the photons provided by the light source, wherein the array of single photon avalanche diodes is positioned in a predefined distance to the light source, and a control coupled to the array of single photon avalanche diodes. The control is configured to determine an arrival time of the photons detected by each of the single photon avalanche diodes of the array of single photon avalanche diodes. The control is also configured to generate a random number on the basis of the arrival time.

According to a second aspect the disclosure provides a method for generating a random number. The method comprises controlling a light source to randomly emit photons, controlling an array of single photon avalanche diodes to detect the photons provided by the light source, wherein the array of single photon avalanche diodes is positioned in a predefined distance to the light source, determining an arrival time of the photons detected by each of the single photon avalanche diodes of the array of single photon avalanche diodes, and generating a random number on the basis of the arrival time.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1A:
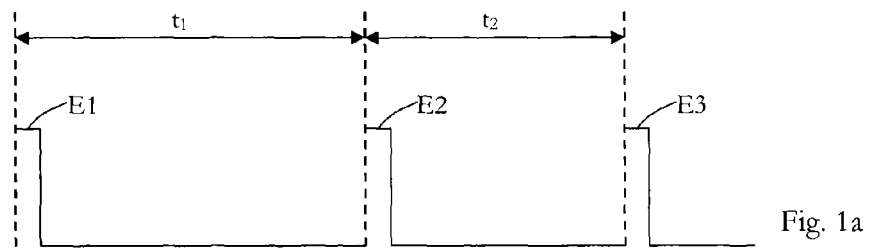
FIG. 1a exemplary illustrates a first procedure for generating random numbers on the basis of arrival times.

Before a detailed description of the embodiments under reference of FIG. 1, general explanations are made.

As discussed above, random numbers are required in many applications, for example, for password or cryptographic key generation, for gaming, etc.

As mentioned in the outset, pseudorandom numbers are used for many applications, since they are easy to generate with a computational algorithm which can be executed by a processor. As pseudorandom numbers are generated with an algorithm, in principal they can be predicted if all seed values are known.

In contrast to this, true random numbers are not predictable, since they are based on a physical phenomenon.

In the present embodiments, the quantum nature of photon emission is used for generation of true random numbers.

An optical (true) random number generator comprises a light source configured to randomly emit photons, an array of single photon avalanche diodes configured to detect the photons provided by the light source, wherein the array of single photon avalanche diodes is positioned in a predefined distance to the light source, and a control coupled to the array of single photon avalanche diodes.

The control is configured to determine an arrival time of the photons detected by each of the single photon avalanche diodes of the array of single photon avalanche diodes and to generate a random number on the basis of the arrival time.

The light source uses the quantum nature of photons, as the emission process is a quantum process and, thus, expected to be random. The light source can comprise e.g. a glow filament, a light emitting diode (also referred to as "LED" hereinafter), a laser diode, a fluorescent lamp or other light units which are configured to emit photons in accordance with a Poisson distribution, i.e. randomly and the single photons are emitted independently form each other. In contrast to a glow filament, light emitting diodes and laser diodes can have a smaller wavelength bandwidth in which photons are emitted. In the case that the light source comprises a glow filament, a filter element or the like can be provided in order to narrow the wavelength bandwidth in which photons are emitted. The light source can also comprise multiple glow filaments, LEDs, and/or laser diodes or other suitable photon emitting units.

In some embodiments, the light source is tuned, i.e. the intensity and/or the wavelength or other parameters of the light source can be tuned, such that the light source emits a predefined number of photons per time interval having a predefined wavelength or lying in a predefined range of wavelengths. Moreover, the light source is configured to emit photons which are (basically) not correlated with each other. In the case of a laser diode, it is also known that, for example, the frequency noise of the laser diode can be used for true random number generation.

The array of single photon avalanche diodes includes multiple single photon avalanche diodes (also referred to as "SPAD" hereinafter). A SPAD can be a solid-state photodetector (on semiconductor basis) in which a photo-generated carrier can trigger an avalanche current due to the impact ionization mechanism. In some embodiments, a SPAD can detect low intensity signals, as it can detect single photons and each SPAD can output the arrival time of the detected photon. The SPADs can output the arrival times of the photons detected with a jitter of typically a few tens of picoseconds.

SPADs exploit similarly to avalanche photodiodes an avalanche current of a reverse biased p-n junction to detect an incident photon. SPADs can be specifically designed to operate with a reverse-bias voltage which is above the breakdown voltage, similarly as it is the case for the Geiger counter. This operation mode is therefore also called "Geiger mode" in analogy with the Geiger counter. As SPADs and also SPAD arrays are, in general, known to the skilled person, a more detailed description of them is omitted hereinafter.

The array of SPADs (also referred to as "SPAD array" hereinafter) can include at least two SPADS, but it can also include more than two, e.g. 2 times 2 (i.e. 4), 4 times 4 (i.e. 16), 2 times 4 (i.e. 8), or any other amount of SPADs. The SPADs can be arranged in rows and columns in the SPAD array, wherein the rows can be horizontally arranged and the columns can be vertically arranged.

The SPAD array is located in a predefined distance to the light source, wherein the distance can be fixed such that the photons emitted from the light source travel a constant distance to the single SPADs of the SPAD array. The SPAD array can have a plane shape and can be arranged such that it is vertical with respect to the ground, without that the present disclosure is limited to a vertical arrangement. The light source can have a diameter that is (much) larger than the diameter of the SPAD array, such that all photons emitted from the light source basically arrive in a parallel manner at the SPAD array and such that all photons travel basically the same distance between the light source and the SPAD array.

Each SPAD outputs an arrival time upon detection of a photon. The arrival time can include a time value, but it can also include only a binary value which is indicative for the detection of the photon by the respective SPAD. In some embodiments, the SPAD array can also include a number or a coordinate which is indicative for the specific SPAD which detected the photon.

The optical random number generator comprises a control coupled to the array of single photon avalanche diodes. In the following, the functionality of the control is described. However, the following description fully applies to embodiments pertaining to a method for generating a (true) quantum random number, e.g. with the optical random number generator described herein.

The control can comprise a processor, a microprocessor, a CPU or the like and it can also comprise other units, which are also explained below under reference of the Figs.

The control determines the arrival times of the photons detected by each of the single photon avalanche diodes of the array of single photon avalanche diode and generates a (true) random number on the basis of the arrival time.

As the generated random number is based on the random emission of photons of the light source, it is expected to be a true random number.

The SPAD array can be coupled to the control over a single data line, through which all arrival time signals of the single SPADs can be transmitted to the control. Alternatively, all SPADs of the SPAD array can be coupled with an own data line to the control. In still other embodiments, also a mixture of data line connection is implemented. For example, each row of SPADs of the SPAD array is coupled via an own line to the control, etc.

The arrival time signals transmitted by the SPAD array can be analog and/or digital.

The random number can be generated on the basis of the timing information of two successive arrival times of two different photons detected by the same SPAD of the SPAD array and/or detected by two different SPADs of the SPAD array. As discussed above, each single SPAD of the SPAD array transmits an arrival time signal to the control upon detection of a photon. On the basis of the time difference of two consecutive arrival times of two consecutive photons the random number can be generated. As mentioned, the arrival times of two consecutive photons can be provided by the same SPAD or by different SPADs.

For extracting bits out of the arrival times determined by the control, two embodiments are described in the following under reference to FIGS. 1a and 1b, wherein the skilled person will appreciate that there exist also other methods for generating the random number on the basis of the arrival times and the present disclosure is not limited in that regard.

In both embodiments two time intervals are defined, wherein the beginning of each time interval is defined by detecting a photon and the associated transmission of an arrival time signal from the respective SPAD.

A binary value of "0" is generated in the case that the first time interval is shorter (longer) than the second time interval and the binary value of "1" is generated in the case that the first time interval is longer (shorter) than the second time interval, thereby one bit is generated. The next bit is generated by repeating the procedure described for following two consecutive time intervals. The following two consecutive time intervals can be directly consecutive to the previous two time intervals and/or there can be at least one further time interval in between them.

In the first embodiment, as illustrated in FIG. 1a, a first time interval $t_1$ starts with the arrival of a first photon detected by a SPAD. The detected photon is illustrated by a first arrival time signal marked as "E1" in FIG. 1a, which is transmitted from the SPAD having detected the photon to the control. The first time interval $t_1$ ends upon detection of a second photon by the same SPAD of the SPAD array and the respective transmitted arrival time signal is marked as "E2" in FIG. 1a. A second time interval $t_2$ starts with detection of the second photon and ends with detection of a third photon and the associated third arrival time signal of the SPAD which detected the third photon is marked as "E3". The first time interval $t_1$ and the second time interval $t_2$ do not overlap.

This applies to each SPAD of the array independently in the present embodiment, without that the present invention is limited in that regard.

As discussed above, the light source randomly emits photons which are not correlated with each other. Hence, also the arrival times of the photons are random.

By defining, for example, that a binary value of "0" is generated if the first time interval $t_1$ is shorter than the second time interval $t_2$, i.e. $t_1<t_2$, and that a binary value of "1" is generated if the first time interval $t_1$ is longer than the second time interval $t_2$, i.e. $t_1>t_2$, a respective bit can be generated. The same procedure is performed for following two consecutive events and the accordingly defined following two consecutive time intervals. Thereby, a true random number can be generated. Of course, the binary values can also be defined in the opposite way, i.e. a binary value of "1" is generated if the first time interval $t_1$ is shorter than the second time interval $t_2$, i.e. $t_1<t_2$, and a binary value of "0" is generated if the first time interval $t_1$ is longer than the second time interval $t_2$, i.e. $t_1>t_2$.

Another procedure for extracting the random number from the arrival times which is very similar to the procedure of FIG. 1a is discussed in the following under reference to FIG. 1b.

Figure 1B:
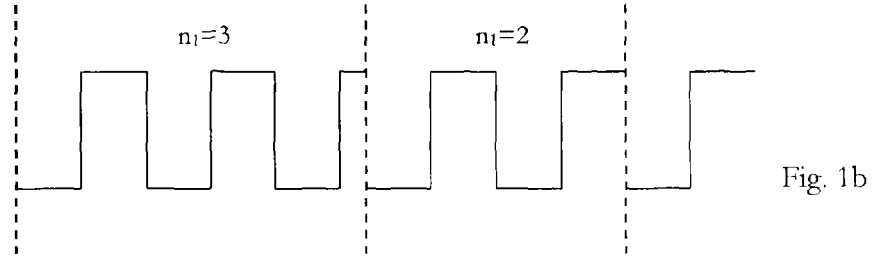
FIG. 1b exemplary illustrates a second procedure for generating random numbers on the basis of arrival times.

In the second embodiment of FIG. 1b, a restartable clock is used for measuring the time interval between two consecutive detected photons, such as the photons illustrated with their signals E1, E2 and E3 in FIG. 1a. The clock starts upon detection of a photon by a SPAD, i.e. upon receipt of a respective arrival time signal transmitted from the respective SPAD. With respect to the example of FIGS. 1b and 1a this means that the clock starts upon detection of the first arrival time signal E1 and the clock is restarted upon detection of the second or third arrival time signal E2 and E3, respectively, etc., upon detection of a photon by the same SPAD.

Thereby, for each time interval which starts upon detection of a photon and the respective arrival time signal, the respective clock signals fitting into the time interval can be counted. In the example of FIGS. 1a and 1b this means that for the first time interval $t_1$ three clock pulses can be counted, i.e. $n_1=3$ (n equal to the number of clock pulses), and for the second time interval $t_2$ two clock pulses can be counted, i.e. $n_2=2$.

The binary values of "0" and "1" can be assigned in a similar manner to the first and second time intervals $t_1$ and $t_2$ as described above, i.e. a binary value of "0" is assigned in the case that the number of clock pulses $n_1$ of the first time interval $t_1$ is smaller than the number of clock pulses $n_2$ of the second time interval $t_2$, i.e. $n_1<n_2$, and a binary value of "1" is assigned in the case that the number of clock pulses $n_1$ of the first time interval $t_1$ is larger than the number of clock pulses $n_2$ of the second time interval $t_2$, i.e. $n_1>n_2$. This procedure is analogously repeated for the following two consecutive time intervals, whereby a true random number can be generated. As mentioned, the binary values can also be defined in the opposite way, i.e. a binary value of "0" is assigned in the case that the number of clock pulses $n_1$ of the first time interval $t_1$ is larger than the number of clock pulses $n_2$ of the second time interval $t_2$, i.e. $n_1>n_2$, and a binary value of "1" is assigned in the case that the number of clock pulses $n_1$ of the first time interval $t_1$ is smaller than the number of clock pulses $n_2$ of the second time interval $t_2$, i.e. $n_1<n_2$. In principle it could happen that the time intervals $t_1$ and $t_2$ and/or the respective counted numbers of clock pulses $n_1$ and $n_2$ are equal to each other. In such cases the event is discarded, since no sinful binary value can be assigned in this case.

In some embodiments, the control is further configured to detect a malfunction of a single photon avalanche diode, for example on the basis of the determined arrival times of the photons. The malfunction can be detected, for example, by monitoring a timer for each SPAD and determining, whether the SPAD detects a photon in a predefined time interval. In the case that a SPAD does not detect a photon in the predefined time interval, the respective SPAD can be identified as defect. Additionally or alternatively, a test circuit provided in each SPAD or in the SPAD array can be driven, which tests the functionality of the SPADs. In some embodiments also the light source can be tuned and controlled by the control and, for example, for testing the SPAD array the intensity of the light source can be increased such that all SPADs of the SPAD array will receive photons in a predefined time interval. Thereby, SPADs which do not detect any photon can be identified as defect. On the other hand, the light source can be turned off such that no photons are emitted, whereby defect SPADs can be identified which transmit a photon arrival time although no photons can be detected, since the light source does not emit any photons.

In some embodiments, the control is further configured to generate a notification in the case of a detected malfunction of a single photon avalanche diode. The notification can include an electronic signal, e.g. an audio signal, a message signal which is displayed on a display or the like.

In some embodiments, the control is further configured to correct for errors origin from a malfunction of a single photon avalanche diode. This error correction can sort out, for example, events where a SPAD having a malfunction contributes. Also the detection of equal time intervals, as discussed above under reference of FIG. 1b (i.e. where $n_1=n_2$), can be considered as an error and such events are discarded, as discussed above.

The control can further be configured to output digital (true) random number data, e.g. in the form of a bit sequence, which can be predefined. The random number data can be compressed, for example, as it is known in the art. Moreover, the control can be configured to output the random number data in a predefined file format or data format.

In some embodiments, the control is further configured to adapt a data rate of the output digital random number data, such as 1, 10, 100 Mbit per second or 1 Gbit per second or any other data rate which is, for example, defined or input by a user.

The control can further be configured to selectively control the single photon avalanche diodes of the array of single photon avalanche diodes. For example, the data rate can be adjusted by adjusting the intensity of the light source and/or by turning on/off single SPADs of the array of SPADs, thereby adjusting the amount of photons detected in a predefined time interval and thereby adjusting the random number data rate.

Some embodiments pertain to a method for generating a (true quantum) random number, for example by controlling an optical random number generator as described above. The method comprises controlling a light source to randomly emit photons, as discussed above, controlling an array of single photon avalanche diodes to detect the photons provided by the light source, wherein the array of single photon avalanche diodes is positioned in a predefined distance to the light source, as discussed above, and determining an arrival time of the photons detected by each of the single photon avalanche diodes of the array of single photon avalanche diodes, as discussed above, and generating a random number on the basis of the arrival time, as discussed above.

The procedures discussed above can also be performed in embodiments pertaining to the method for generating a random number. Accordingly, the explanations as made above fully apply to the following description of embodiments of methods for generating a random number.

The method can further comprise detecting a malfunction of a single photon avalanche diode, wherein the detection of a malfunction of a single photon avalanche diode can be based on the determined arrival time, as discussed above in detail.

The method can further comprise generating a notification in case of a detected malfunction of a single photon avalanche diode, as discussed above in detail.

The method can further comprise correcting for errors origin from a malfunction of a single photon avalanche diode, as discussed above in detail.

The method can further comprising outputting digital random number data, wherein the data rate of the output digital random number data can be adapted, as discussed above.

In some embodiments, the method can further comprise the selective control of the single photon avalanche diodes of the array of single photon avalanche diodes.

The methods as described herein can also be implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 2:
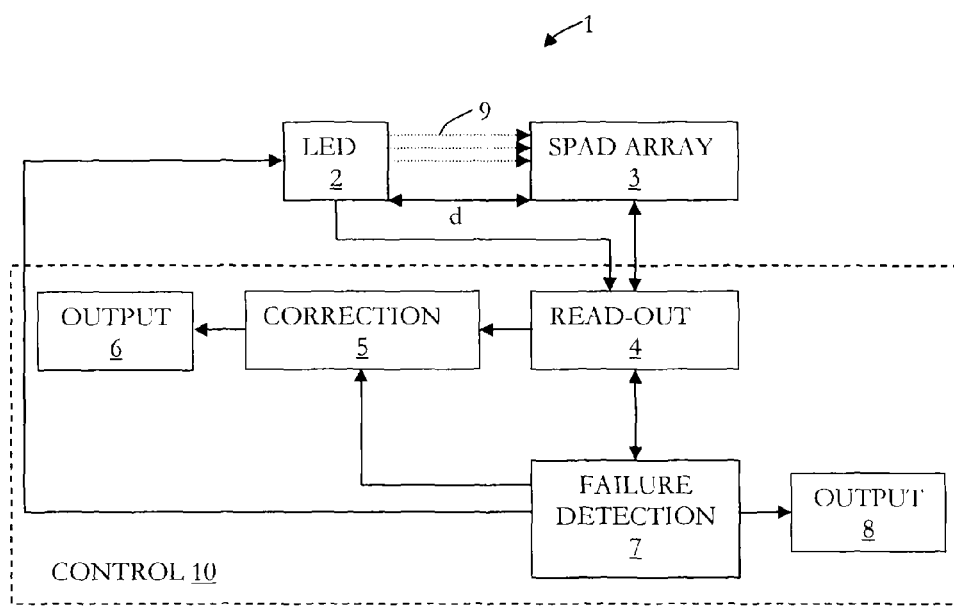
FIG. 2 schematically illustrates an embodiment of a true random number generator.

Returning to FIG. 2, there is illustrated an embodiment of a true random number generator 1 which generators true random numbers on the basis of the random photon emission of a tuned light emitting diode LED 2 as a light source.

Although in the present embodiment one LED 2 is used, the present invention is not limited in that regard and it can be used also two or more LEDs.

The LED 2 generators photons 9 which are detected by an array of single photo avalanche diodes 3, referred to as SPAD array 3 hereinafter. LED 2 is arranged in a predefined distance "d" from SPAD array 3.

The LED 2 has a diameter which is much larger than the SPAD array such that it can be assumed, as an approximation in the present embodiment, that the photons 9 incident nearly parallel on the SPAD array 3. The SPAD array 3 has multiple SPADs (single photon avalanche diodes) which are arranged in an array, i.e. in rows and columns. In the present embodiment, the SPAD array 3 has 128 times 128 SPADs, i.e. 16384 pixels, wherein each pixel corresponds to one SPAD. The detection area of each of the SPADs of the SPAD array 3 faces in the direction of the LED 2 and, thus, in the direction of the incident photons 9. In the present embodiment only one SPAD array 3 is provided, but the skilled person will appreciate that also two or more SPAD arrays can be used and the present disclosure is not limited in that regard.

For controlling of the true random number generator 1, a control 10 is provided, which comprises a read-out and timing unit 4, a digital correction unit 5, an digital output 6, a failure detection and notification unit 7 and a notification output unit 8. Please note that the division of the control 10 into units 3 to 8 is only made for illustration purposes and that the present invention is not limited to any specific division of functions in specific units. For instance, the control 10 could be implemented by a respective programmed processor, field programmable gate array (FPGA) and the like and the units 4-8 can be implemented in software and/or hardware.

In the present embodiment, the procedure for assigning binary values is implemented which has been described above under reference to FIG. 1b.

The read-out and timing unit 4 is coupled to the SPAD array 3 and receives arrival time signals generated by the SPADs of the SPAD array 3. It generates a respective clock, which is triggered by the detection of a photon 9 by a respective SPAD of the SPAD array and upon receipt of a respective arrival time signal output by the SPAD which detected the photon, as described also above in connection with FIG. 1b.

The clock frequency of the clock signal generated by the read-out and timing unit 4 can be adapted in some embodiments, e.g. in response to a user input and/or in dependence on intensity adjusted for the tuned LED 2.

For example, in the case that a high intensity for the LED 2 is adjusted, the frequency of the clock signal could be increased in order to be able to dissolve different detected photons accordingly. The intensity of the LED 2 can be adjusted by the read-out and timing unit 4 which is also coupled to the LED 2. The read-out and timing circuit 4 can also adjust the intensity of the LED 2 in dependence of a dead-time of the SPADs of the SPAD array 3. In the present embodiment, the SPADs of the SPAD array 3 have an identical or at least nearly identical dead time, such that the dead time of the SPADs of the SPAD array 3 cancels out when applying the above described procedure for extracting the bits out of the arrival times.

The read-out and timing unit 4 generates respective binary values, i.e. bits, as discussed above in connection with FIG. 1b and outputs a respective bit stream to the digital correction unit 5.

The digital correction unit 5 can perform digital correction, for example, by cancelling bits which are based on a faulty event. A faulty event is present, for example, when, as discussed above, two time intervals are identified as identical or in the case that, for example, the data rate of the bits transmitted from the read-out and timing circuit 4 varies. In the latter case the digital correction unit 5 buffers the received bits and adapts the data rate accordingly, which is transmitted to the coupled digital output unit 6.

The digital output unit 6 outputs the bits received from the digital correction unit 5. The format of the random number bit stream can be, for example, 1 Gbit/s. The digital output unit 6 can also be configured to output the random number in a data file having a predefined file format.

Additionally, the read-out and timing unit 4 outputs data received from the SPAD array 3 to the failure detection and notification unit 7, such as the arrival time signals received from the SPAD array 3. The failure detection and notification unit 7 analyzes the arrival time signals and detects a malfunction of a SPAD of the SPAD array 3, for example, in the case that one specific SPAD continuously transmits arrival time signals and/or in the case that a specific SPAD did not transmit an arrival time signal in a predefined time interval.

The failure detection and notification unit 7 is also coupled to the LED 2. For performing tests, the failure detection and notification unit 7 can, for example, turn off the LED 2 either by controlling the LED 2 directly or indirectly over the read-out and timing unit 4, such that SPADs can be detected which output an arrival time signal although it cannot detect any photon, since the LED 2 is turned off.

Moreover, the failure detection and notification unit 7 can adjust the intensity of the LED 2 such that all SPADs of the SPAD array 3 should nearly simultaneously detect photons. Thereby, SPADs can be detected which do not detect a photon and, thus, do not output an arrival time signal, and/or which output an arrival time signal much slower (later) than other SPADs of the SPAD array 3.

In the case of detection of a malfunction of a SPAD of the SPAD array 3, the failure detection and notification unit 7 can generate a respective notification which is transmitted to the coupled notification output unit 8 which outputs the notification, e.g. on a display coupled to it. The notification could be a general notification that a malfunction exists and/or it can be a specific notification, for example notifying which and/or how many of the SPADS of the SPAD array 3 have a malfunction.

The failure detection and notification unit 7 also transmits a failure signal to the digital correction unit 5 which can accordingly correct the bit stream, for instance, by discarding bits where an erroneous SPAD was involved or by "whitening" the bit sequence and thereby marking it as invalid.

The failure detection and notification unit 7 can also adjust the read-out and timing unit 4 and/or the LED 2 in accordance with detected erroneous SPADs of the SPAD array 3.

For example, the data rate of the output random number data can be adjusted to the number of erroneous SPADs. Assume, for example, that 90% of the SPADs of the SPAD array 3 have a malfunction, the output data rate, the clock frequency of the read-out and timing unit 4 and/or the intensity of the LED 2 can be accordingly decreased.

Hence, by using an array of SPADs the true random number generator 1 can still be used even in the case of a malfunction of one or more SPADs and the output data rate can be increased compared with a single SPAD due to the simultaneous usage of the multiple SPADs of the SPAD array 3.

Figure 3:
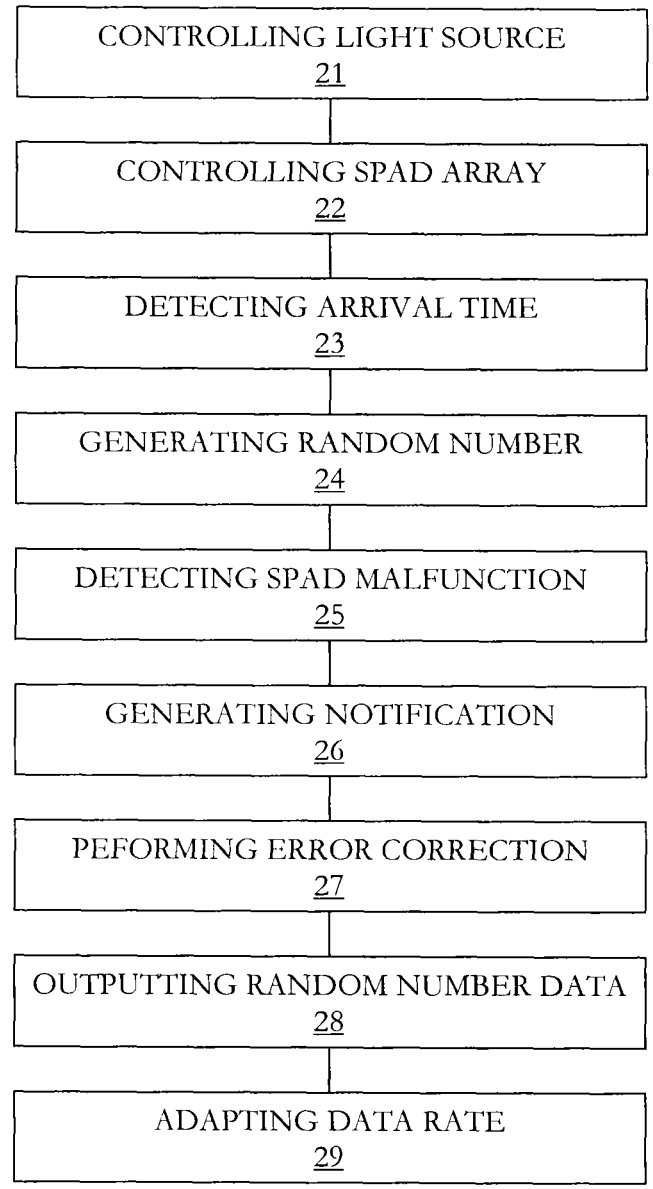
FIG. 3 shows a flow diagram of a method for generating a true random number.

In the following, a method 20 for generating true random number by using the optical random number generator 1 as discussed above under reference of FIG. 2 is explained under reference of FIG. 3. Of course, the explanations made above also apply to the method 20.

At 21, a light source, such as LED 2, is controlled source to randomly emit photons.

At 22, an array of single photon avalanche diodes, such as SPAD array 3, is controlled to detect the photons provided by the light source, wherein the array of single photon avalanche diodes is positioned in a predefined distance to the light source.

At 23 an arrival time of the photons is detected by each of the single photon avalanche diodes of the array of single photon avalanche diodes.

At 24 a random number is generated on the basis of the arrival time, as also discussed above in detail.

At 25 a malfunction of a single photon avalanche diode is detected, e.g. the basis of the determined arrival time.

At 26, a notification is generated in the case of a detected malfunction of a single photon avalanche diode.

At 27, errors originated from a malfunction of a single photon avalanche diode are corrected.

At 28, digital random number data are output and the data rate of the output digital random number data can be adapted at 29.

Note that the present technology can also be configured as described below.

(1) An optical random number generator, comprising:
a light source configured to randomly emit photons;
an array of single photon avalanche diodes configured to detect the photons provided by the light source, wherein the array of single photon avalanche diodes is positioned in a predefined distance to the light source; and
a control coupled to the array of single photon avalanche diodes and configured to determine an arrival time of the photons detected by each of the single photon avalanche diodes of the array of single photon avalanche diodes; and
generate a random number on the basis of the arrival time.

(2) The optical random number generator of (1), wherein the light source includes a light emitting diode.

(3) The optical random number generator of (1) or (2), wherein the light source includes laser diode.

(4) The optical random number generator of anyone of (1) to (3), wherein the control is further configured to detect a malfunction of a single photon avalanche diode.

(5) The optical random number generator of (4), wherein the control is further configured to detect a malfunction of a single photon avalanche diode on the basis of the determined arrival time.

(6) The optical random number generator of (4) or (5), wherein the control is further configured to generate a notification in case of a detected malfunction of a single photon avalanche diode.

(7) The optical random number generator of anyone of (1) to (6), wherein the control is further configured to correct for errors origin from a malfunction of a single photon avalanche diode.

(8) The optical random number generator of anyone of (1) to (7), wherein the control is further configured to output digital random number data.

(9) The optical random number generator of (8), wherein the control is further configured to adapt a data rate of the output digital random number data.

(10) The optical random number generator of anyone of (1) to (9), wherein the control is further configured to selectively control the single photon avalanche diodes of the array of single photon avalanche diodes.

(11) A method for generating a random number, comprising:
controlling a light source to randomly emit photons;
controlling an array of single photon avalanche diodes to detect the photons provided by the light source, wherein the array of single photon avalanche diodes is positioned in a predefined distance to the light source;
determining an arrival time of the photons detected by each of the single photon avalanche diodes of the array of single photon avalanche diodes; and
generating a random number on the basis of the arrival time.

(12) The method of (11), wherein the light source includes a light emitting diode.

(13) The method of (11) or (12), wherein the light source includes laser diode.

(14) The method of anyone of (11) to (13), further comprising detecting a malfunction of a single photon avalanche diode.

(15) The method of (14), further comprising detecting a malfunction of a single photon avalanche diode on the basis of the determined arrival time.

(16) The method of (14) or (15), further comprising generating a notification in case of a detected malfunction of a single photon avalanche diode.

(17) The method of anyone of (11) to (16), further comprising correcting for errors origin from a malfunction of a single photon avalanche diode.

(18) The method of anyone of (11) to (17), further comprising outputting digital random number data.

(19) The method of (18), further comprising adapting a data rate of the output digital random number data.

(20) The method of anyone of (11) to (19), further comprising selectively control the single photon avalanche diodes of the array of single photon avalanche diodes.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The present application claims priority to European Patent Application 14 158 968.9, filed in the European Patent Office on 11 Mar. 2014, the entire contents of which being incorporated herein by reference.

The invention claimed is:

1. An optical random number generator, comprising:
a light source configured to randomly emit photons;
an array of single photon avalanche diodes configured to detect the photons emitted directly from the light source, wherein the array of single photon avalanche diodes is positioned in a predefined distance to the light source; and
a control coupled to the array of single photon avalanche diodes and configured to determine an arrival time of the photons detected by each of the single photon avalanche diodes of the array of single photon avalanche diodes; and
generate a random number on the basis of the arrival time.

2. The optical random number generator of claim 1, wherein the light source includes a light emitting diode.

3. The optical random number generator of claim 1, wherein the light source includes laser diode.

4. The optical random number generator of claim 1, wherein the control is further configured to correct for errors origin from a malfunction of a single photon avalanche diode.

5. The optical random number generator of claim 1, wherein the control is further configured to detect a malfunction of a single photon avalanche diode.

6. The optical random number generator of claim 5, wherein the control is further configured to detect a malfunction of a single photon avalanche diode on the basis of the determined arrival time.

7. The optical random number generator of claim 6, wherein the control is further configured to generate a notification in case of a detected malfunction of a single photon avalanche diode.

8. The optical random number generator of claim 1, wherein the control is further configured to output digital random number data.

9. The optical random number generator of claim 8, wherein the control is further configured to adapt a data rate of the output digital random number data.

10. The optical random number generator of claim 9, wherein the control is further configured to selectively control the single photon avalanche diodes of the array of single photon avalanche diodes.

11. A method for generating a random number, comprising:
controlling a light source to randomly emit photons;
controlling an array of single photon avalanche diodes to detect the photons emitted directly from the light source, wherein the array of single photon avalanche diodes is positioned in a predefined distance to the light source;
determining an arrival time of the photons detected by each of the single photon avalanche diodes of the array of single photon avalanche diodes; and
generating a random number on the basis of the arrival time.

12. The method of claim 11, wherein the light source includes a light emitting diode.

13. The method of claim 11, wherein the light source includes laser diode.

14. The method of claim 11, further comprising correcting for errors origin from a malfunction of a single photon avalanche diode.

15. The method of claim 11, further comprising detecting a malfunction of a single photon avalanche diode.

16. The method of claim 15, further comprising detecting a malfunction of a single photon avalanche diode on the basis of the determined arrival time.

17. The method of claim 16, further comprising generating a notification in case of a detected malfunction of a single photon avalanche diode.

18. The method of claim 11, further comprising outputting digital random number data.

19. The method of claim 18, further comprising adapting a data rate of the output digital random number data.

20. The method of claim 19, further comprising selectively control the single photon avalanche diodes of the array of single photon avalanche diodes.

* * * * *